(12) United States Patent
Parris et al.

(10) Patent No.: US 11,789,224 B2
(45) Date of Patent: Oct. 17, 2023

(54) OPTICAL FIBRE UNIT FOR AIR-BLOWN INSTALLATIONS

(71) Applicant: Prysmian S.p.A., Milan (IT)

(72) Inventors: Donald Ray Parris, Lomagna (IT); Ian James Griffiths, Milan (IT)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 17/576,447

(22) Filed: Jan. 14, 2022

(65) Prior Publication Data

US 2022/0236508 A1    Jul. 28, 2022

(30) Foreign Application Priority Data

Jan. 28, 2021 (IT) .................. 102021000001742

(51) Int. Cl.
G02B 6/44 (2006.01)

(52) U.S. Cl.
CPC ........... *G02B 6/4432* (2013.01); *G02B 6/441* (2013.01); *G02B 6/4486* (2013.01)

(58) Field of Classification Search
CPC .................................................... G02B 6/4432
See application file for complete search history.

(56) References Cited

U.S. PATENT DOCUMENTS

| 4,684,214 | A | * | 8/1987 | Goldmann | H01B 7/18 385/112 |
| 5,561,729 | A | * | 10/1996 | Parris | G02B 6/4432 385/100 |
| 5,762,847 | A | * | 6/1998 | Kamps | G02B 6/4432 264/36.19 |
| 6,035,087 | A | * | 3/2000 | Bonicel | G02B 6/441 385/112 |
| 6,127,632 | A | * | 10/2000 | Oswald | H01B 7/046 174/121 R |
| 6,400,873 | B1 | | 6/2002 | Gimblet et al. | |
| 6,487,345 | B1 | * | 11/2002 | Dixon | G02B 6/443 385/100 |
| 9,223,103 | B2 | | 12/2015 | Kachmar | |
| 2009/0250241 | A1 | * | 10/2009 | Galletti | H01B 7/187 174/110 SR |

(Continued)

FOREIGN PATENT DOCUMENTS

| CN | 104614828 B | | 1/2018 | |
| JP | 04186206 A | * | 7/1992 | ........... G02B 6/4438 |

OTHER PUBLICATIONS

JP 04186206 A English translation (Year: 1992).*

(Continued)

*Primary Examiner* — Charlie Y Peng
(74) *Attorney, Agent, or Firm* — Frost Brown Todd LLP

(57) ABSTRACT

An optical fibre unit includes one or more optical fibres; an outer jacket surrounding the one or more optical fibres, made of a fibre reinforced polymer comprising inorganic fibres embedded in a polymer matrix in an amount comprised between 5 and 25 wt % with respect to the weight of the fibre reinforced polymer, the inorganic fibres having a median length (d50) comprised between 50 and 250 μm; and a skin layer surrounding the outer jacket and in direct contact thereto, having a thickness comprised between 0.05 mm and 0.5 mm and being free from fibres.

8 Claims, 8 Drawing Sheets

(56) References Cited

U.S. PATENT DOCUMENTS

2016/0274324 A1 9/2016 Sutehall et al.
2019/0025531 A1 1/2019 Sales Casals et al.

OTHER PUBLICATIONS

Kapsalis, Alexandros; Search Report and Written Opinion issued in Italian Patent Application No. IT 202100001742; dated Sep. 21, 2021; 10 pages including English translation of Written Opinion.

* cited by examiner

OPTICAL FIBRE UNIT FOR AIR-BLOWN INSTALLATIONS

BACKGROUND

Technical Field

The present disclosure relates to optical fibre units for air-blown installations.

Description of the Related Art

Fibre optic cables have been commonly deployed by blowing or pulling in ducts, by burying them in the ground, or suspending them between above-ground poles.

Optical fibre units suitable for use in blown fibre systems typically comprise one or more optical fibres surrounded by an outer sheath, optionally bearing beads into its outer surface. The outer sheath is typically made of polymeric material, e.g. polyethylene. However, polymeric materials have a thermal coefficient of expansion (and contraction) higher than glass, potentially causing a significant (and sometimes excessive) cable contraction and optical fibre attenuation at low temperatures.

Therefore, fibre reinforced polymer (FRP) as optical cable jacket material has been proposed to control the polymer material shrinkage. As reported, for example, by U.S. Pat. No. 5,561,729, short fibres are preferred over long fibres as less impacting the polymer material mechanical properties (particularly the stiffness), but they should be loaded in a greater amount than long fibres to obtain a significant shrinkage reduction. On the other hand, suitable amount of short fibres in polymer jacket material can provide a rough cable surface increasing the friction and thus reducing the potential cable blowing distance.

Several solutions are known in the art, which however do not relate to cables for air-blown installations.

The just mentioned U.S. Pat. No. 5,561,729 relates to telecommunications cables including elements (e.g. a sheath) made of a thermoplastic material which is reinforced by discontinuous reinforcement fibres made of materials such as glass. The reinforcement fibres each have a length of less than 0.2 cm (e.g. from around 0.02 cm to around 0.20 cm) and are incorporated in the thermoplastic material to reduce the coefficient of thermal expansion of the thermoplastic material. For reinforcement fibres of a length of around 0.02 cm to around 0.06 cm, the preferred maximum proportion by weight of the reinforcement fibres is about 25%. A reduction in the length of the reinforcement fibres used may have a substantial impact on tube brittleness.

U.S. Pat. No. 9,223,103 relates to a telecommunications cable having a layer adapted to resist post-extrusion shrinkage. In one embodiment, the layer is an outer jacket of the cable. The jacket includes a base material and a plurality of discrete shrinkage-reduction members (e.g., rods, tendrils, extensions, fibres, etc.) embedded within the base material. The members have lengths in the range of 0.2 mm-100 mm. The shrink-reduction material constitutes less than 2% of the total weight of the jacket, but other embodiments can use more than 2% by weight of the shrink-reduction material.

U.S. Pat. No. 6,400,873 relates to fibre optic cables having at least one strength member. The strength member includes a matrix and a plurality of fibres disposed within the matrix. The matrix can be formed of a thermoset material. Alternatively, the matrix can be formed of a thermoplastic material, such as a polyolefin. Fibre optic cable also includes a protective jacket surrounding strength member. Protective jacket is formed of a plastic material. In one embodiment, strength member has a diameter of 2.0 mm and protective jacket has a diameter of 3.0 mm.

SUMMARY OF THE DISCLOSURE

The Applicant therefore aims at providing an optical fibre unit for air-blown installations with a limited cable contraction (and expansion) and, consequently, a limited optical fibre attenuation, having a sufficient stiffness for the cable blowing, while maintaining at the same time a sufficient flexibility, a low coefficient of friction against the duct walls, and without impairing the duct cleanness.

This aim is achieved by an optical fibre unit for air-blown installations comprising:
  one or more optical fibres;
  an outer jacket surrounding the one or more optical fibres, made of a fibre reinforced polymer comprising inorganic fibres embedded in a polymer matrix in an amount comprised between 5 and 25 wt % with respect to the weight of the fibre reinforced polymer, the inorganic fibres having a median length d50 comprised between 50 and 250 μm; and
  a skin layer surrounding the outer jacket and in direct contact thereto, the skin layer having a thickness comprised between 0.05 mm and 0.5 mm and being free from fibres.

In the present description and claims, as optical fibre is meant a glass optical waveguide surrounded by a glass cladding to form the optical core. The optical core is surrounded by one or more protective layer, for example a primary and a secondary acrylate coating and, optionally, a buffer layer made of thermoplastic material.

In an embodiment, the optical fibres are embedded in an inner layer made of polymeric material. The inner layer is surrounded and can be in direct contact with the outer sheath.

In an embodiment, the outer jacket fibre reinforced polymer comprises inorganic fibres in an amount comprised between 10 and 20 wt % with respect to the weight of the fibre reinforced polymer.

In the present description and claims, as median length (d50) is meant the medium value of the fibre length distribution, it is the value of the fibre length at 50% in the cumulative distribution.

In an embodiment, the inorganic fibres of the present disclosure have a median length (d50) comprised between 100 and 200 μm.

In an embodiment, the inorganic fibres have a diameter comprised between 14 and 16 μm.

In an embodiment, the inorganic fibres comprise glass fibres.

In an embodiment, the outer jacket polymer matrix is made of a material selected from polyethylene (PE), for example high-density polyethylene (HDPE), polyamide (PA) or polyester.

In an embodiment, the outer jacket has a thickness comprised between 0.3 mm and 3 mm. The outer jacket is thicker than the skin layer.

In an embodiment, the skin layer has a surface roughness lower than the surface roughness of the outer jacket.

In an embodiment, the skin layer has a thickness of 0.1 to 0.3 mm.

In an embodiment, the skin layer is made of a polymeric material selected from polyethylene (PE), polyamide (PA) or polyester.

In an embodiment, the skin layer is made of a material including additives like lubricants or slipping agent for reducing the skin layer surface friction. Examples of suitable additives are waxes or fatty acid amides, like oleamide, erucamide and stearamide.

BRIEF DESCRIPTION OF THE DRAWINGS

Further characteristics and advantages will be more apparent from the following description of some embodiments given as a way of an example with reference to the attached drawings in which.

DETAILED DESCRIPTION

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

The present disclosure, in at least one of the aforementioned aspects, can be implemented according to one or more of the following embodiments, optionally combined together.

For the purpose of the present description and of the appended claims, the words "a" or "an" should be read to include one or at least one and the singular also includes the plural unless it is obvious that it is meant otherwise. This is done merely for convenience and to give a general sense of the disclosure.

Figure 1:
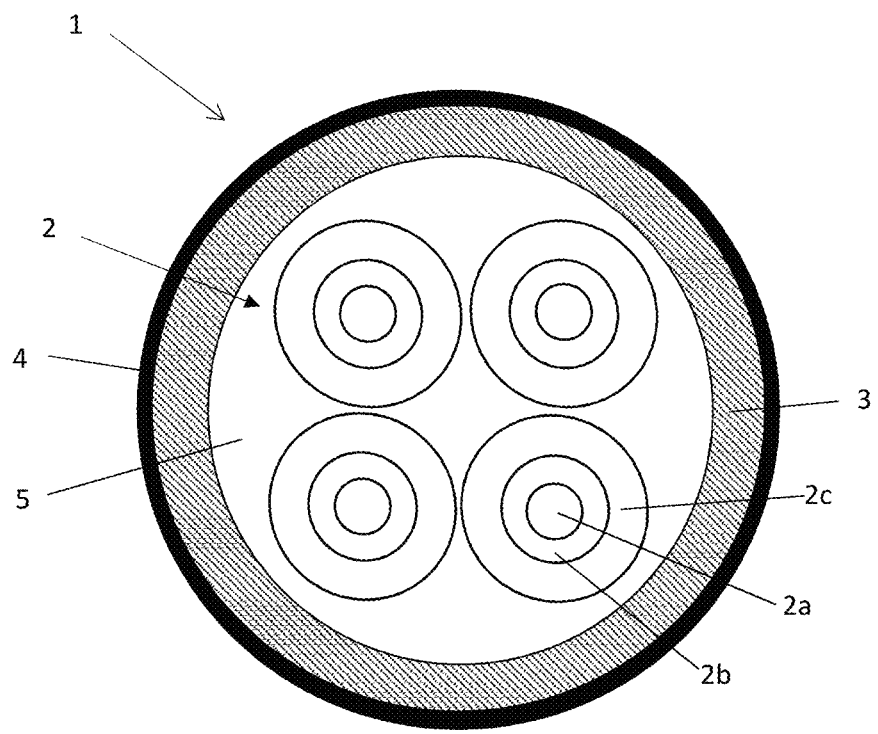
FIG. 1 shows a sectional view of an optical fibre unit for air-blown installations according to an embodiment of the present disclosure.

FIG. 1 shows an embodiment of an optical fibre unit 1 according to the present disclosure. The optical fibre unit 1 is adapted for air-blown installations, as discussed in the introductory part of the present description.

The optical fibre unit 1 comprises one or more optical fibres 2. In the example of FIG. 1 four optical fibres 2 are provided. However, in other examples (not shown) the number of optical fibres 2 could be higher or lower. It should be noticed that the number of optical fibres 2 is not relevant for the present invention and the number of optical fibres could be any number.

Each optical fibre 2 of FIG. 1 comprises an optical core 2a, a protective coating system 2b and a buffer 2c.

The optical fibres suitable for the unit of the present disclosure may be single mode or multimode optical fibres. The optical fibres generally extend in a longitudinal direction. For example, the optical fibres 2 are arranged in a bundle.

The optical fibre unit 1 comprises an outer jacket 3 surrounding the optical fibres 2.

The outer jacket 3 is made of a fibre reinforced polymer comprising inorganic fibres embedded in a polymer matrix. The fibre reinforced polymer comprises the inorganic fibres in an amount comprised between 5 and 25 wt %, wherein "wt %" means the weight percentage of the inorganic fibres with respect to the total weight of the fibre reinforced polymer. In an embodiment, the amount of the inorganic fibres is comprised between 10 and 25 wt %, still more preferably between 15 and 20 wt %.

The inorganic fibres have a median length d50 comprised between 50 and 250 μm. As said above, the median length d50 is the value of the fibre length at 50% in the cumulative distribution. For example, when d50=100 μm, then 50% of the inorganic fibres in the polymer matrix are longer than 100 μm, and 50% are shorter than 100 μm. In an embodiment, the inorganic fibres have a median length d50 comprised between 100 and 200 μm.

The inorganic fibres can comprise, for example, glass fibres. It is to be noted that two or more different types of inorganic fibres can be embedded in the polymer matrix.

In an embodiment, the outer jacket 3 has a thickness comprised between 0.3 mm and 3 mm.

In an embodiment, the outer jacket 3 is based on a polymeric material like polyethylene, polyamide or polyester.

Figure 2A:
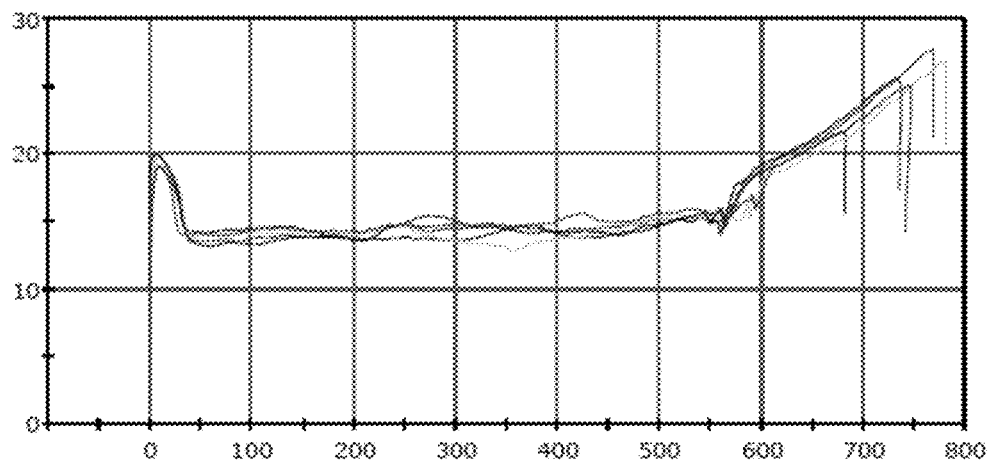
FIGS. 2a and 2b are graphs showing tensile stress (in ordinate) vs. elongation (in abscissa) of samples made of glass fibre filled HDPE and samples made of unfilled HDPE.
Figure 2B:
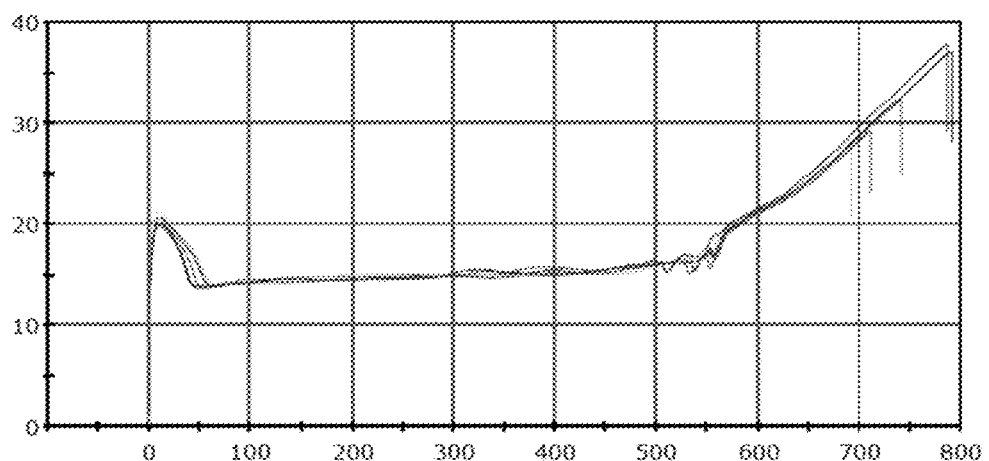

The Applicant has tested samples made of fibre reinforced polymer of the type used for the outer jacket of the optical fibre unit according to the present disclosure for evaluating the mechanical properties of the same compared to the mechanical properties of a polymeric sample of the type used for the outer jacket in a known optical fibre unit. FIG. 2a is a graph of tensile stress (as σ [MPa], in ordinate) vs. elongation (as ε [%], in abscissa) of five samples made of HDPE glass fibre filled according to the disclosure, and FIG. 2b is an analogous graph of tensile stress vs. elongation of five samples made of the same HDPE, but unfilled. The tests have been performed according to IEC 60811-2-1 (2001) at a speed of 50.0 mm/min. As can be seen from the graphs in the FIGS. 2a and 2b, both for HDPE glass fibre filled according to the disclosure and for unfilled HDPE show a similar tensile behaviour and fracture occurs at about 700% of elongation, showing that the addition of inorganic fibres to the polymeric material does not substantially impair its mechanical properties.

Figure 3A:
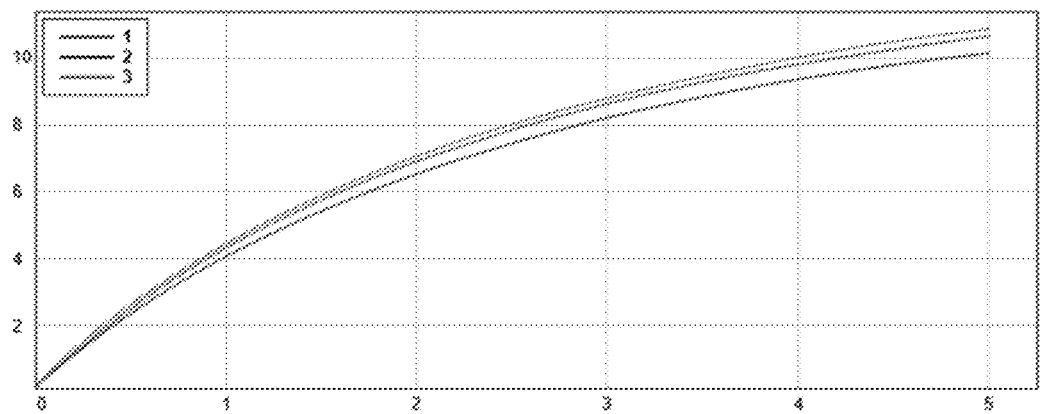
FIGS. 3a and 3b are graphs showing flexural stress (in ordinate) vs. flexural strain (in abscissa) of samples made of glass fibre filled HDPE and samples made of unfilled HDPE.
Figure 3B:
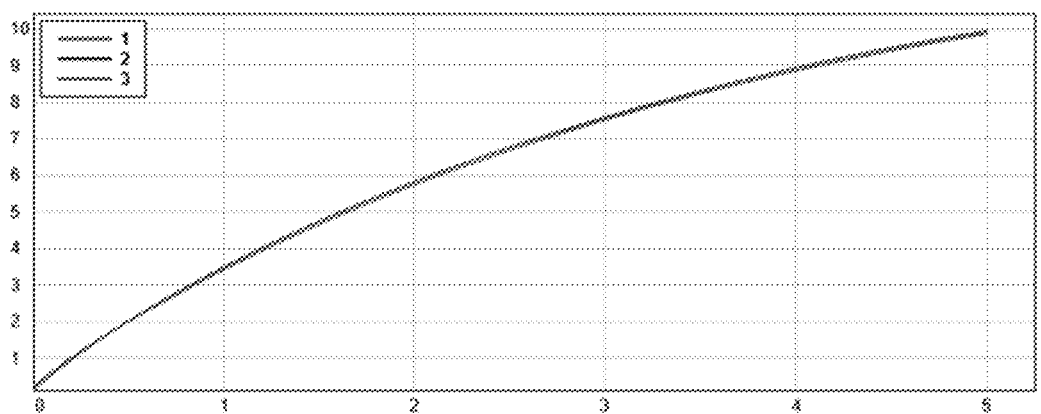

Similar tests have been performed for evaluating the flexural properties. Particularly, FIG. 3a is a graph of flexural stress (as $\sigma_f$ [MPa], in ordinate vs. flexural strain (as $\varepsilon_f$ [%], in ordinate) of three samples made of HDPE glass fibre filled according to the present disclosure, and FIG. 3b is an analogous graph of flexural stress vs. flexural strain of three samples made of the same HDPE, but unfilled. The tests have been performed according to ASTM D790-10 at a speed of 1.20 mm/min. As can be seen from the graphs in the FIGS. 3a and 3b, both the HDPE glass fibre filled according to the present disclosure samples and the unfilled HDPE samples show a 3% flexural strain at a flexural stress of about 8 MPa, showing that the addition of inorganic fibres to the polymeric material does not substantially impair its mechanical properties.

Referring again to FIG. 1, the optical fibre unit 1 comprises a skin layer 4 surrounding and in direct contact with the outer jacket 3. The skin layer 4 has a thickness comprised between 0.05 mm and 0.5 mm. Preferably, the skin layer thickness is comprised between 0.1 mm and 0.3 mm. The outer jacket 3 is thicker than the skin layer 4.

The skin layer 4 has a surface roughness which is lower than the surface roughness of the outer jacket 3 containing inorganic fibres. This improves the optical fibre unit blowability because the friction between the duct wall and the optical fibre unit is reduced.

The skin layer 4 can be made of a material like polyethylene (PE), polyamide (PA) or a polyester. In an embodiment, the material of the skin layer 4 is similar or the same as that of the outer jacket 3.

The skin layer 4 material can include additives and/or lubricants for further reducing the above-mentioned friction. In an embodiment, the additives/lubricants can be selected from waxes or fatty acid amides.

The skin layer 4 can be extruded over the outer jacket 3 or coextruded with the same.

The Applicant has tested an optical fibre unit according to the present disclosure for evaluating the optical fibre attenuation as a function of the temperature. Particularly, an optical fibre unit according to the present disclosure, having an outer jacket with glass fibres embedded in a HDPE matrix (with no skin layer as not relevant for the performance of the fibres as a function of the temperature), has been compared to a comparative optical fibre unit according to the known art having an unfilled HDPE outer jacket. The "optical fibre attenuation" is the reduction in intensity of the light beam with respect to distance travelled through the optical fibre.

Figure 4A:
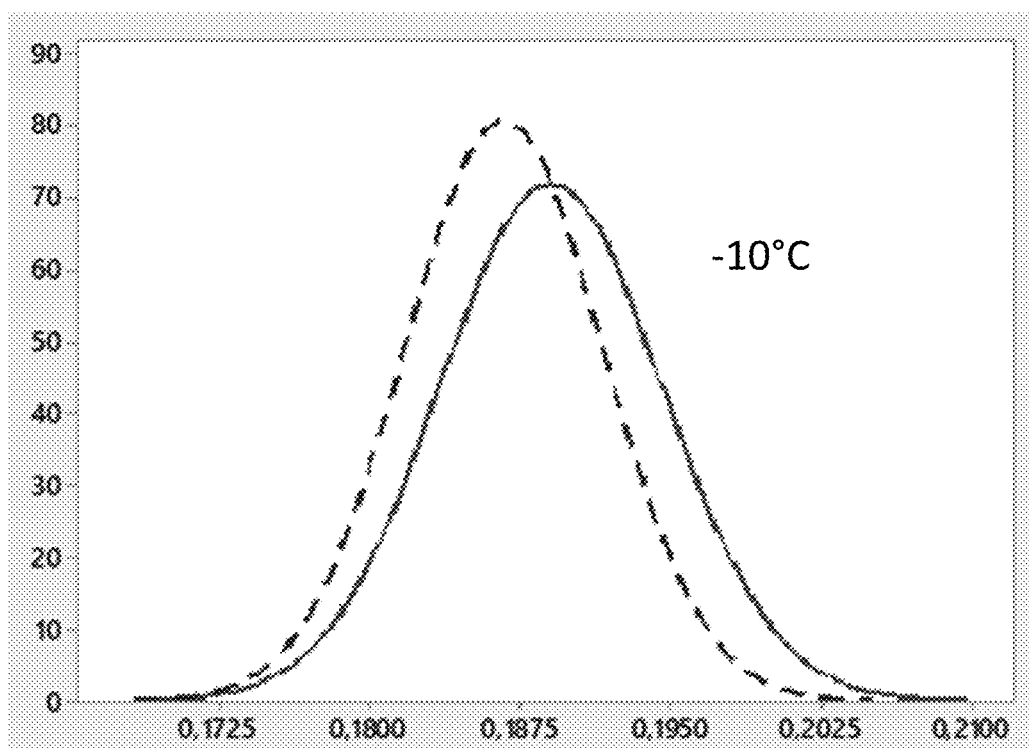
FIGS. 4a-4i are graphs showing the distribution of the optical fibre attenuation of the optical fibre unit according to an embodiment and in an optical cable according to the prior art.
Figure 4B:
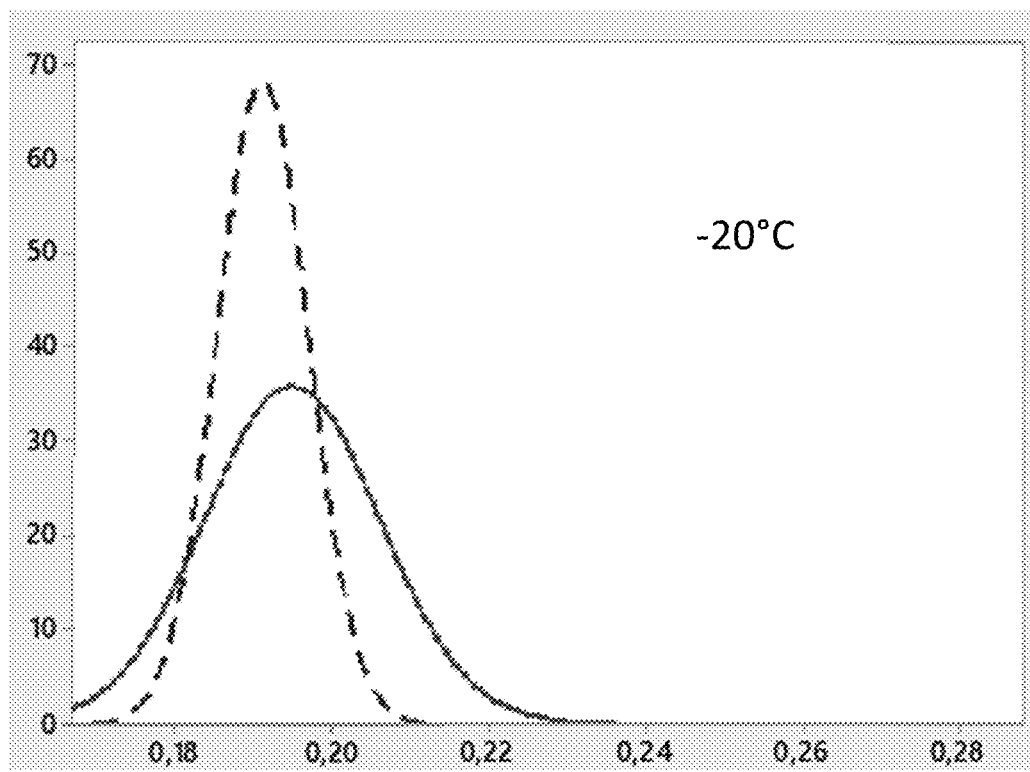
Figure 4C:
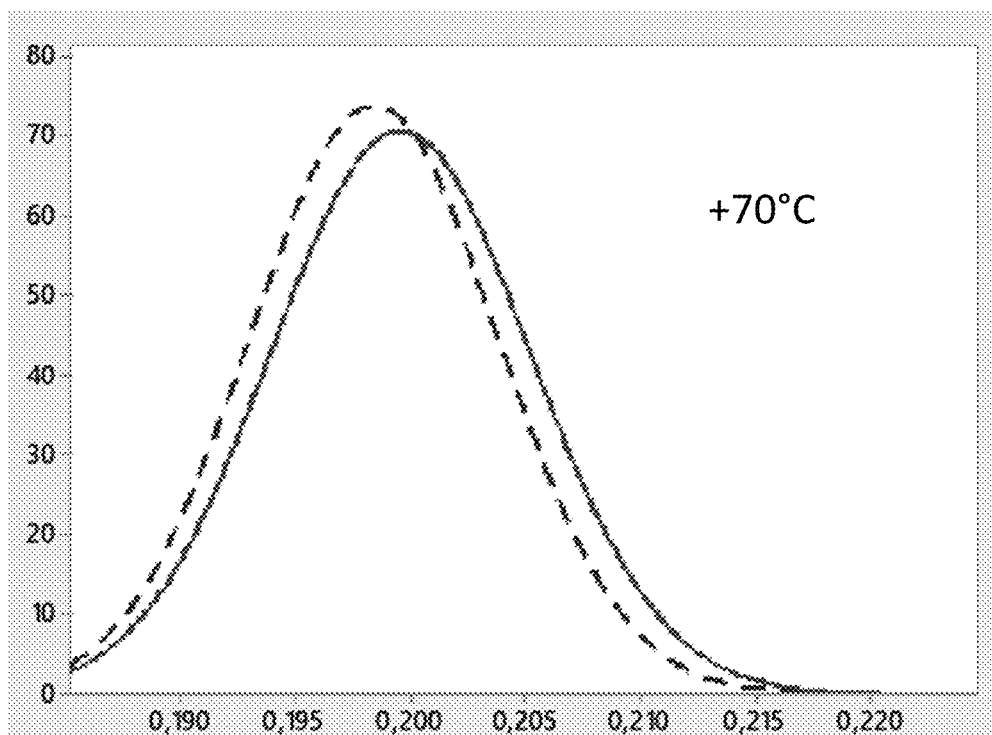
Figure 4D:
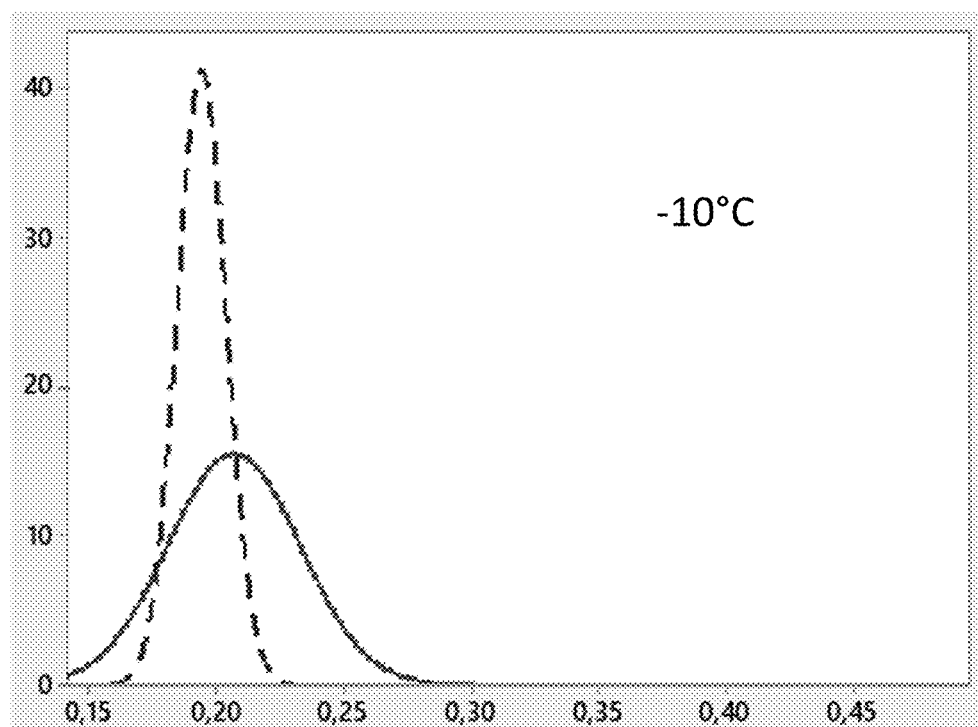
Figure 4E:
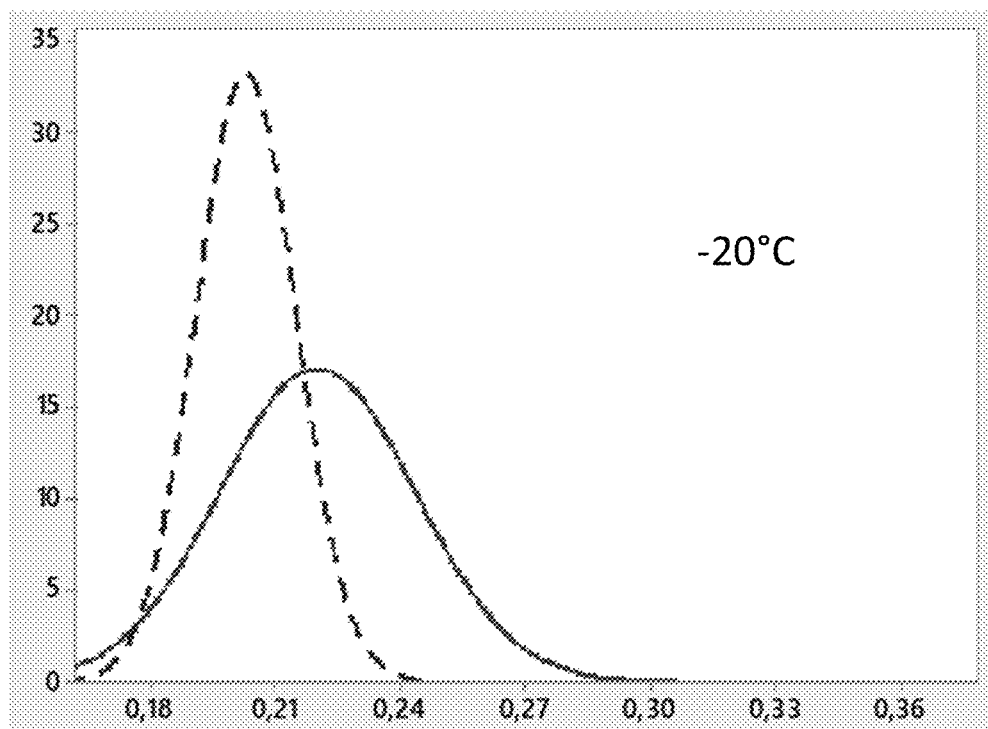
Figure 4F:
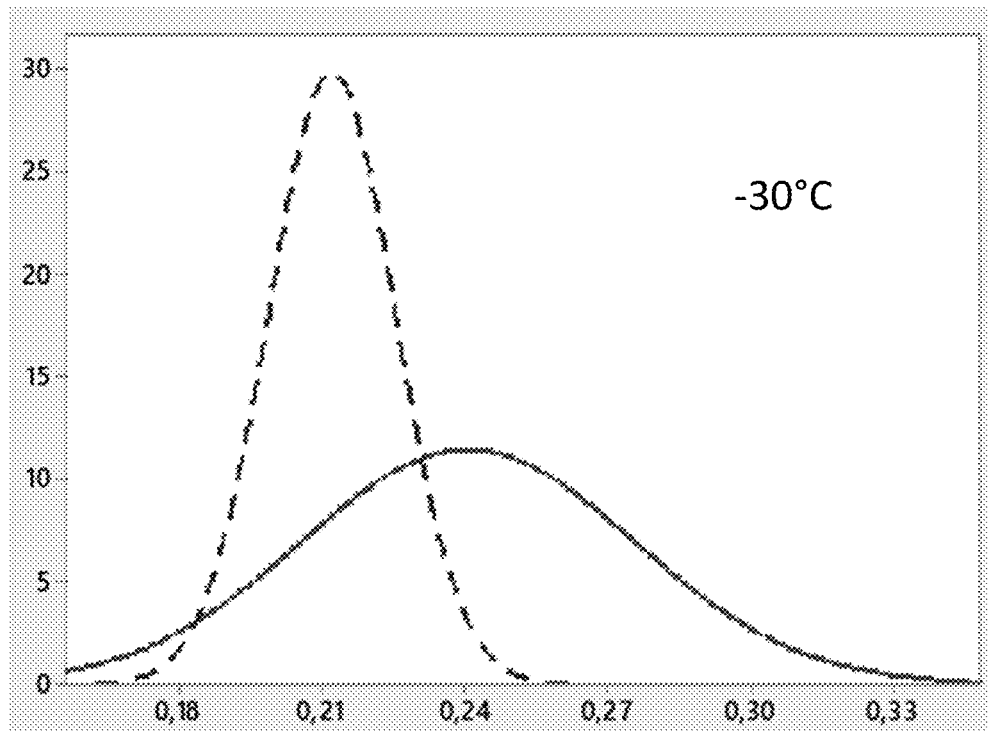
Figure 4G:
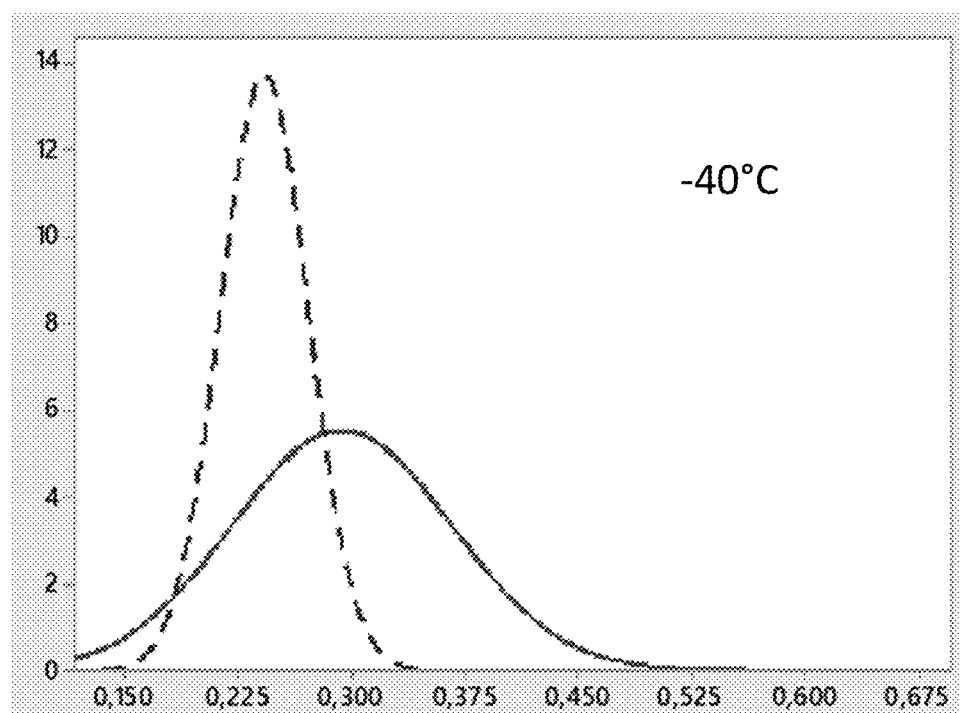
Figure 4H:
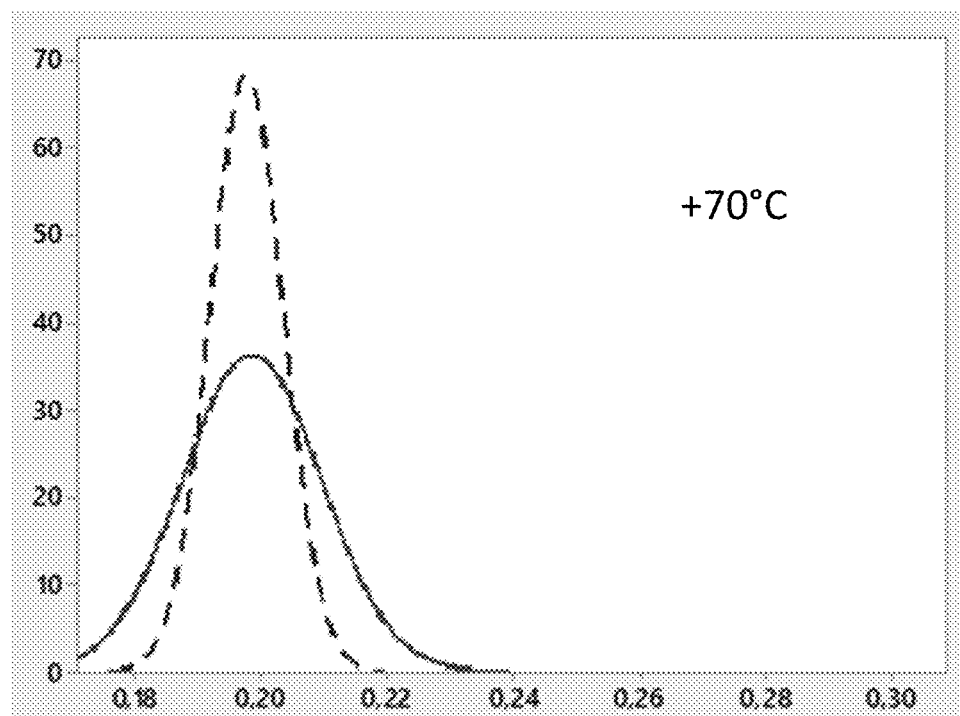
Figure 4I:
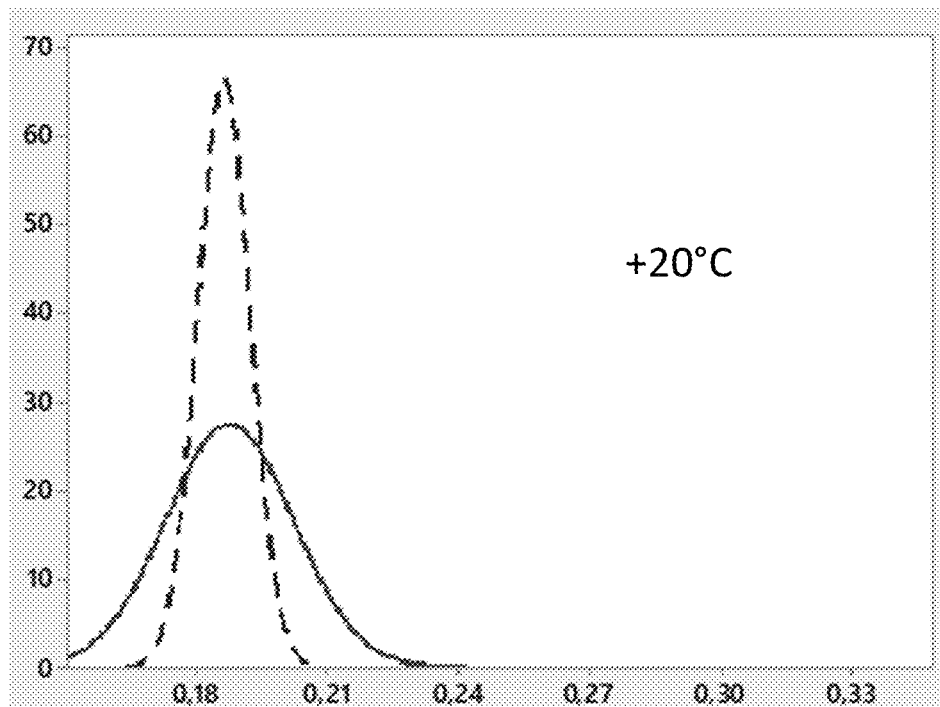

FIGS. 4a-4i are graphs showing the distribution (in ordinate) of the optical fibre attenuation (as db/Km, in abscissa), at a wavelength of 1550 nm, in all the optical fibres of the optical fibre unit according to the present disclosure (dashed line) and in the optical fibres of the comparative optical cable unit (continuous line). The distribution is shown for different temperatures after two temperature cycles (the same fibres were used for all the cycles), particularly:

First cycle:
  @ −10° C. (FIG. 4a)
  @ −20° C. (FIG. 4b)
  @ +70° C. (FIG. 4c)
Second cycle:
  @ −10° C. (FIG. 4d)
  @ −20° C. (FIG. 4e)
  @ −30° C. (FIG. 4f)
  @ −40° C. (FIG. 4g)
  @ +70° C. (FIG. 4h)
  @ +20° C. (FIG. 4i)

The above-mentioned graphs show that during the first cycle the optical fibre attenuation of the optical cable unit of the present disclosure is slightly better than that of the comparative optical cable unit. The first cycle of tests is introductory to the second cycle, the results of the latter being the test bench for understanding the optical cable behaviour once installed. During the second cycle, the optical fibre unit according to the present disclosure always showed a substantially better behaviour than that of the comparative optical cable unit. In particular, the curve representing the distribution of the optical attenuation in the optical fibres of the optical fibre unit according to the present disclosure is generally narrower than the one of the optical fibre unit of the known art, and this means a more uniform behaviour for the optical fibres in the units of the invention. Also, according to the British Telecommunications specification CW1854 (2019) for air blown fiber, during test, maximum variation of fibre attenuation should be 0.10 dB/Km. As shown in Table I, the attenuation peak of the optical fibres in the unit of the invention varied of 0.06 dB/Km at most, while the attenuation peak of the optical fibers in the comparative unit varied of 0.11 dB/Km (thus unsuitable for the BT standard).

TABLE I

| | Peak (mean value) (dB/Km) | | | | | |
|---|---|---|---|---|---|---|
| | −10° C. | −20° C. | −30° C. | −40° C. | +70° C. | +20° C. |
| Dashed curve | 0.19 | 0.20 | 0.21 | 0.24 | 0.19 | 0.18 |
| Continuous curve | 0.20 | 0.22 | 0.24 | 0.29 | 0.19 | 0.18 |

What is claimed is:

1. Optical fibre unit comprising:
   one or more optical fibres;
   an outer jacket surrounding the one or more optical fibres, made of a fibre reinforced polymer comprising inorganic fibres embedded in a polymer matrix in an amount comprised between 10 and 20 wt % with respect to the weight of the fibre reinforced polymer, the inorganic fibres having a median length (d50) comprised between 50 and 250 µm and a diameter comprised between 14 and 16 µm; and
   a skin layer surrounding the outer jacket and in direct contact thereto, having a thickness comprised between 0.1 mm and 0.3 mm and being free from fibres.

2. The optical fibre unit of claim 1, wherein the inorganic fibres have a median length (d50) comprised between 100 and 200 µm.

3. The optical fibre unit of claim 1, wherein the inorganic fibres comprise glass fibres.

4. The optical fibre unit of claim 1, wherein the outer jacket polymer matrix is made of a material selected from polyethylene, polyamide or polyester.

5. The optical fibre unit of claim 1, wherein the outer jacket has a thickness comprised between 0.3 mm and 3 mm, with the outer jacket being thicker than the skin layer.

6. The optical fibre unit of claim 1, wherein the skin layer has a surface roughness which is lower than a surface roughness of the outer jacket.

7. The optical fibre unit of claim 1, wherein the skin layer is made of a material selected from polyethylene, polyamide or polyester.

8. The optical fibre unit of claim 1, wherein the skin layer includes additives for reducing the skin layer surface frictions.

* * * * *